(12) United States Patent
Linevich

(10) Patent No.: US 8,866,314 B2
(45) Date of Patent: Oct. 21, 2014

(54) METHOD FOR OPERATING A POWER ROTARY ACTUATOR AND A POWER PLANT FOR CARRYING OUT SAID METHOD

(75) Inventor: Edvid Ivanovich Linevich, Artjom (RU)

(73) Assignee: Permotors GmbH (AT)

( * ) Notice: Subject to any disclaimer, the term of this patent is extended or adjusted under 35 U.S.C. 154(b) by 1045 days.

(21) Appl. No.: 12/867,453

(22) PCT Filed: Oct. 2, 2008

(86) PCT No.: PCT/RU2008/000631
§ 371 (c)(1),
(2), (4) Date: Nov. 22, 2010

(87) PCT Pub. No.: WO2009/102232
PCT Pub. Date: Aug. 20, 2009

(65) Prior Publication Data
US 2011/0057457 A1 Mar. 10, 2011

(30) Foreign Application Priority Data
Feb. 12, 2008 (RU) .................................. 2008105388

(51) Int. Cl.
*F02B 63/04* (2006.01)
*H02K 7/10* (2006.01)
*H02K 7/18* (2006.01)

(52) U.S. Cl.
USPC .................................. 290/1 C; 310/74; 322/4

(58) Field of Classification Search
USPC .......... 290/1 C, 1 A; 322/4; 74/572.1; 310/74
See application file for complete search history.

(56) References Cited

U.S. PATENT DOCUMENTS

| 3,210,579 | A | * | 10/1965 | Sonoda et al. ................... 310/81 |
| 3,558,901 | A | * | 1/1971 | Jacobus ...................... 290/30 R |
| 3,609,426 | A | * | 9/1971 | Gaul .................................. 322/4 |
| 3,860,844 | A | * | 1/1975 | Hetzel ........................... 310/104 |

(Continued)

FOREIGN PATENT DOCUMENTS

| GB | 146783 | 7/1920 | | |
| JP | 06339247 A | * 12/1994 | ............... H02K 7/04 |
| SU | 417301 | 2/1974 | | |
| SU | 1061856 | 12/1983 | | |

*Primary Examiner* — Julio C. Gonzalez
(74) *Attorney, Agent, or Firm* — Morriss O'Bryant Compagni, PC

(57) ABSTRACT

The invention relates to inertial systems for the accumulation and conversion of energy, and can be used as a power unit to drive various machines and vehicles. According to the disclosed method, a source of mechanical oscillations is used to generate an alternating rotational torque which is applied to the working train made capable of unidirectional rotational motion. An inertial vibrator disposed axially on the working train is used as the oscillation source. The power unit putting the method into practice comprises an electrical generator, a control device and a power drive, including a base on which a first assembly is disposed, with the capability of unidirectional rotation and including a driving train for the transmission of operating torque and a motor with the capability of free rotation of at least one member with unbalanced mass on a shaft disposed on the first assembly axially relative to the rotation of the driving train, in so doing the kinematic linkage between it and the final driven train contains a second assembly having the capability to transmit the operating torque. The invention makes it possible to eliminate the negative feedback effect of the mechanical load on the motor.

16 Claims, 5 Drawing Sheets

(56) References Cited

U.S. PATENT DOCUMENTS

| | | | | |
|---|---|---|---|---|
| 4,241,615 | A | * | 12/1980 | Ryan ................................ 74/61 |
| 4,307,629 | A | * | 12/1981 | Moller .......................... 475/255 |
| 4,446,418 | A | * | 5/1984 | Richardson ...................... 322/4 |
| 4,940,336 | A | * | 7/1990 | Dryga et al. .................. 366/128 |
| 6,946,748 | B2 | * | 9/2005 | Love ............................ 290/1 C |
| 6,998,723 | B2 | * | 2/2006 | Kong et al. .................... 290/1 C |
| 2004/0026925 | A1 | * | 2/2004 | Tung Kong et al. .......... 290/1 R |
| 2006/0244263 | A1 | * | 11/2006 | Manning ....................... 290/1 R |
| 2007/0120430 | A1 | * | 5/2007 | Kurosawa ....................... 310/74 |
| 2008/0143302 | A1 | * | 6/2008 | Pierce ............................... 322/4 |
| 2008/0156128 | A1 | * | 7/2008 | Chou ............................. 74/352 |
| 2008/0180067 | A1 | * | 7/2008 | Kurosawa ......................... 322/4 |

* cited by examiner

METHOD FOR OPERATING A POWER ROTARY ACTUATOR AND A POWER PLANT FOR CARRYING OUT SAID METHOD

CROSS-REFERENCE TO RELATED APPLICATIONS

The present application claims priority to PCT Application PCT/RU2008/000631 filed on Oct. 2, 2008 and Russian Patent Application No. 2008105388 filed with the Russian Patent Office on Feb. 12, 2008, the entirety of each of which are incorporated by this reference.

BACKGROUND

1. Technical Field

The invention relates to operating methods for rotary power actuators, in particular to inertial systems for the accumulation and conversion of energy, and can be used to drive various machines, vehicles, etc.

2. Prior Art

Inertial (flywheel) motors are known in which energy is stored in the form of the mechanical energy of a rapidly-turning rotor which is then used to drive various devices (see, for example, N. V. Gulina—Inertsiya, Moscow: Nauka Publishing House, 1982; N. V Gulina—Inertial energy accumulators. Voronezh, Voronezh University Publishers, 1973). In known inertial motors useful work is performed by utilising the kinetic energy of rotation of a flywheel accumulator which is thereby subject to braking action.

Devices are known in the form of rotary transmissions with accumulation and subsequent release of energy, wherein the rotation of unbalanced masses is utilised for these purposes (for example: DE2612035A1, published. 22.03.1976; FR1588205, published Oct. 4, 1970; U.S. Pat. No. 3,960,036, Jan. 6, 1976). In particular, there is a known mass accelerator and power converter device (U.S. Pat. No. 4,498,357, published Dec. 2, 1985), in which use is made of an intermittent motion mechanism including a working train, wherein there is developed with the aid of a source of mechanical oscillations an alternating rotational torque which is applied to the working train made capable of rotational motion.

A drawback of the known technical solutions is that the motor incorporated therein designed to rotate the unbalanced masses (eccentric weights) is mounted separately from the common rotating platform with the eccentric weights on a fixed based. For this reason the mechanical resistance force of the load applied to the working train ultimately also acts on the eccentric weight drive shaft.

SUMMARY OF THE INVENTION

The present invention overcomes the aforementioned drawbacks by increasing the efficiency and stabilizing the operation of the rotary power actuator, for example by reducing or eliminating the counteracting friction torque of the drive members to the rotation of the drive motor shaft To achieve this, an operating method for a rotary power actuator is proposed using an intermittent motion mechanism including a working train, wherein with the aid of a source of mechanical oscillations there is developed an alternating rotational torque which is then applied to the working train made capable of rotational motion. What is novel is that the oscillation source is provided by a centrifugal vibrator in the form of at least one member with unbalanced mass which is rotated freely by a motor axially to the working train at a determined speed, in so doing the motor and member with unbalanced mass are mounted on the working train, and at least one freewheeling clutch is used in the intermittent motion mechanism.

The proposed power unit putting the disclosed method into practice includes an electrical generator, a power drive for the rotation thereof, and a control device. What is novel is that the power drive includes a base whereon are mounted at least a first assembly capable of unidirectional rotation and including a driving train for the transmission of operating torque, a motor and a master actuator with the capability of free rotation by the motor of at least one member with unbalanced mass on a shaft located on the first assembly axially to the rotation of the driving gear, and in so doing the kinematic train between it and the final driven gears includes a second assembly capable of transmitting the operating torque.

At least one electric motor may be used as the master actuator, in which the rotor or stator are provided with an unbalanced mass.

The member or members with unbalanced mass may be connected to the motor through a reducer gear.

The electric motor may be mounted on the first assembly coaxially with the driving train and provided with the capability of synchronous-symmetrical rotation of two or more members with unbalanced mass.

In so doing the members with unbalanced mass may take the form of unbalanced driven gearwheels kinematically linked to a common driving gearwheel connected to the motor shaft.

The first assembly may be connected to the base by means of a freewheeling clutch.

A second freewheeling clutch may be used as the second assembly.

The power unit may be equipped with a step-up gear (multiplying gear) in which the low-speed member is kinematically linked to the drive train, and the high-speed member of which is connected to a load, for example to the rotor of an electrical generator.

BRIEF DESCRIPTION OF THE DRAWINGS

The invention will be understood more clearly with reference to the drawings in which.

The following numerical references are used: 1—base, 2—fixed shaft, 3—first freewheeling clutch, 4—gear wheel, 5—platform, 6—electric motor, 7—electric motor shaft, 8—driving pinion, 9 and 10—driven pinions, 11 and 12—axes of rotation, 13 and 14—unbalanced masses, 15—current collector, 16—pinion, 17—gear wheel, 18—shaft, 19—pinion, 20—second freewheeling clutch, 21—electrical generator, 22—electrical generator rotor, 23—foundation.

The following conventional letter symbols are also used in the figures: X and Y—coordinate axes; $\Omega$—angular speed of rotation of the platform 5 and driving gear wheel 4; $\omega$—angular speed of rotation of the mass 14; r—radius of rotation of the mass 14; R—radius of translational rotation of the axis 12; F—centrifugal force; FY—projection of centrifugal force F on the Y axis; Fx—projection of centrifugal force F on the X axis. The curved arrows indicate the directions of rotation and torque.

ILLUSTRATED EMBODIMENTS OF THE INVENTION

Figure 3:
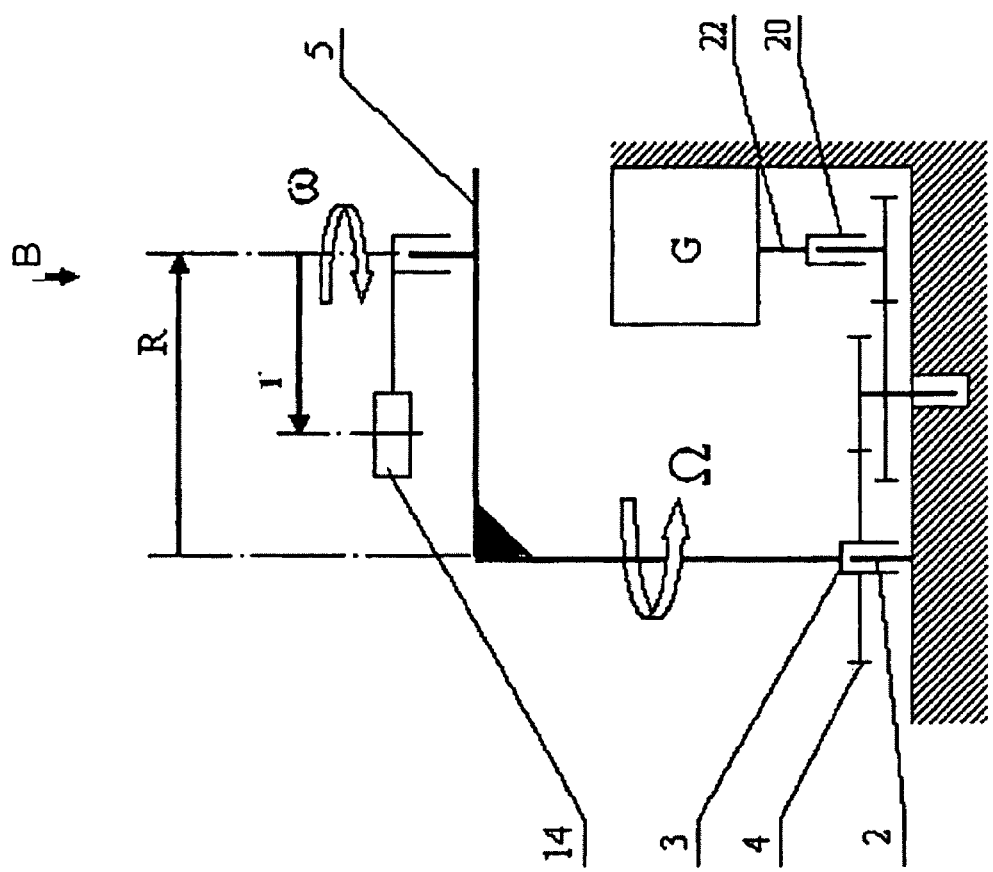
FIG. 3 is a kinematic diagram of the power unit.

The power unit includes a base 1 carrying a fixed shaft 2 with a first freewheeling clutch 3 mounted thereon. The inner ring of the clutch 3 is fixed and its outer ring is able to rotate freely only in the direction Ω (see FIG.3 and FIG.4). On the outer ring of the clutch 3 are attached a gearwheel 4 and a platform 5. The following are carried on the platform 5: shafts 11 and 12 whereon are mounted pinions 9 and 10 capable of free rotation and including unbalanced masses 13 and 14; electric motor 6 on the shaft 7 of which is attached driving pinion 8 disposed in meshing engagement with the driven pinions 9 and 10. The current collector 15 is designed to deliver a power supply to the electric motor 6. The pinion 16 and gearwheel 17 are mounted on a common shaft 18 with the ability to rotate. The gearwheels and pinions 4, 16, 17 and 19 form a two-stage multiplying gear designed to increase the rotational speed of the shaft 22 connected to the rotor of the electric generator 21. The shaft 22 is connected to the pinion 19 via a second freewheeling clutch 20. The latter transmits operating torque to the shaft 22 as the rotational speed of the pinion 19 increases, and breaks the kinematic chain when the rotational speed of the pinion 19 decreases, in accordance with the graph shown in FIG.5.

Figure 4:
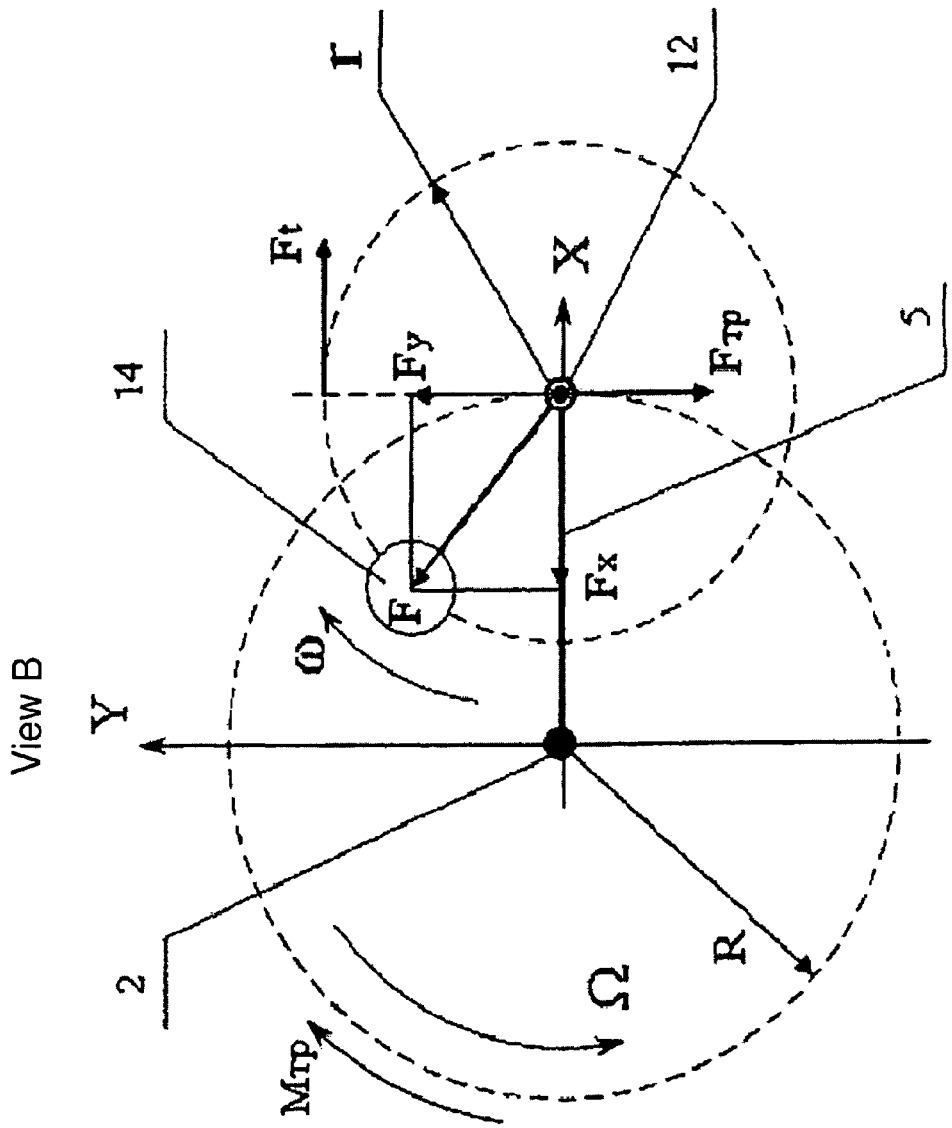
FIG. 4 is view B in FIG 3.
Figure 5:
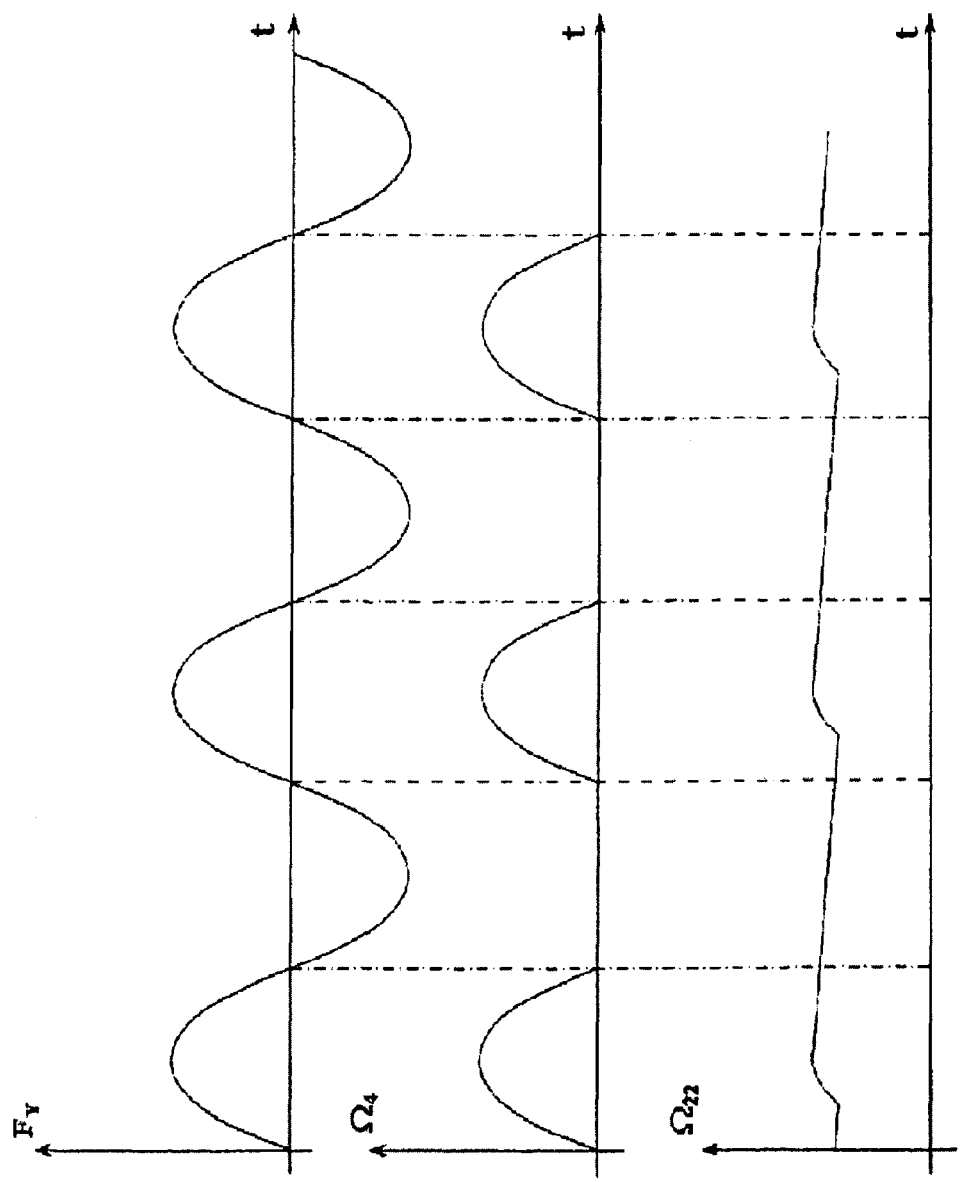
FIG. 5 contains graphs: FY(t)—centrifugal force; $\Omega_4(t)$—angular velocity of the driving train; $\Omega_{22}(t)$—angular velocity of the electric generator rotor.

The power unit works as follows. Power is supplied from the source to the electric motor 6. The latter runs up to its rated speed and rotates the pinions 9 and 10 with the unbalanced masses 14 and 13 up to the speed ω. Rotation of the mass 14, for example, generates a centrifugal force F. Said force is always exerted along the radius r, perpendicular to the shaft 12, and therefore the start of the force vector F may be placed at the centre of 12 (FIG.4). Its projection $F_Y$ onto the Y axis varies according to a harmonic law:

$$F_Y = F \cdot \sin(\omega t) = m \cdot \omega^2 \cdot r \cdot \sin(\omega t), \quad (1)$$

where m—mass 14 (see, for example, A. A. Yablonsky—Course in theoretical mechanics. Part 11. Dynamics. Moscow, Vysshaya Shkola, 1971, p. 142). The projection of the force F onto the X axis equals $F_x$. The result of the centrifugal forces on the X axis always equals zero as they are mutually balanced out by the symmetrically disposed eccentric masses. The centrifugal force component $F_Y$ generates operating torque M relative to the shaft 2 exerted on the driving toothed wheel 4 with the value:

$$M = F_Y \cdot R = m \cdot \omega^2 \cdot r \cdot R \cdot \sin(\omega t). \quad (2)$$

The vector of force $F_Y$ is always perpendicular to the radius R. A friction torque (mechanical load) $M_{TP}$ is simultaneously exerted on the gearwheel 4 and platform 5. The friction torque $M_{TP}$ generates a friction force $F_{TP}$ that is always perpendicular to the radius R, acts on a straight line coincident with the vector $F_Y$ and is exerted on the shaft 12 opposite the latter. In so doing, the tangential force $F_T$ generated by the motor 6 and the rotating unbalanced mass 14 is in turn always directed perpendicular to the vector $F_Y$. This means that the torque $M_{TP}$ does not counteract the rotation of the shaft 7 of the motor 6, by virtue of which the efficiency is appreciably increased and the operation of the drive system as a whole is stabilised.

It should be noted that centrifugal force is related to the forces of inertia, and the latter are external forces for any mechanical system. This means that the operating torque M exerted on the wheel 4 is a moment of external force and, ultimately, is applied through the shaft 2 on the base 1. Therefore, the base 1 must be securely attached to the foundation 23. When using the method in devices intended for mounting on vehicles, it will be necessary to install two identical assemblies with the operating torque acting in opposite directions so as to mutually balance out the action thereof on the vehicle.

Figure 1:
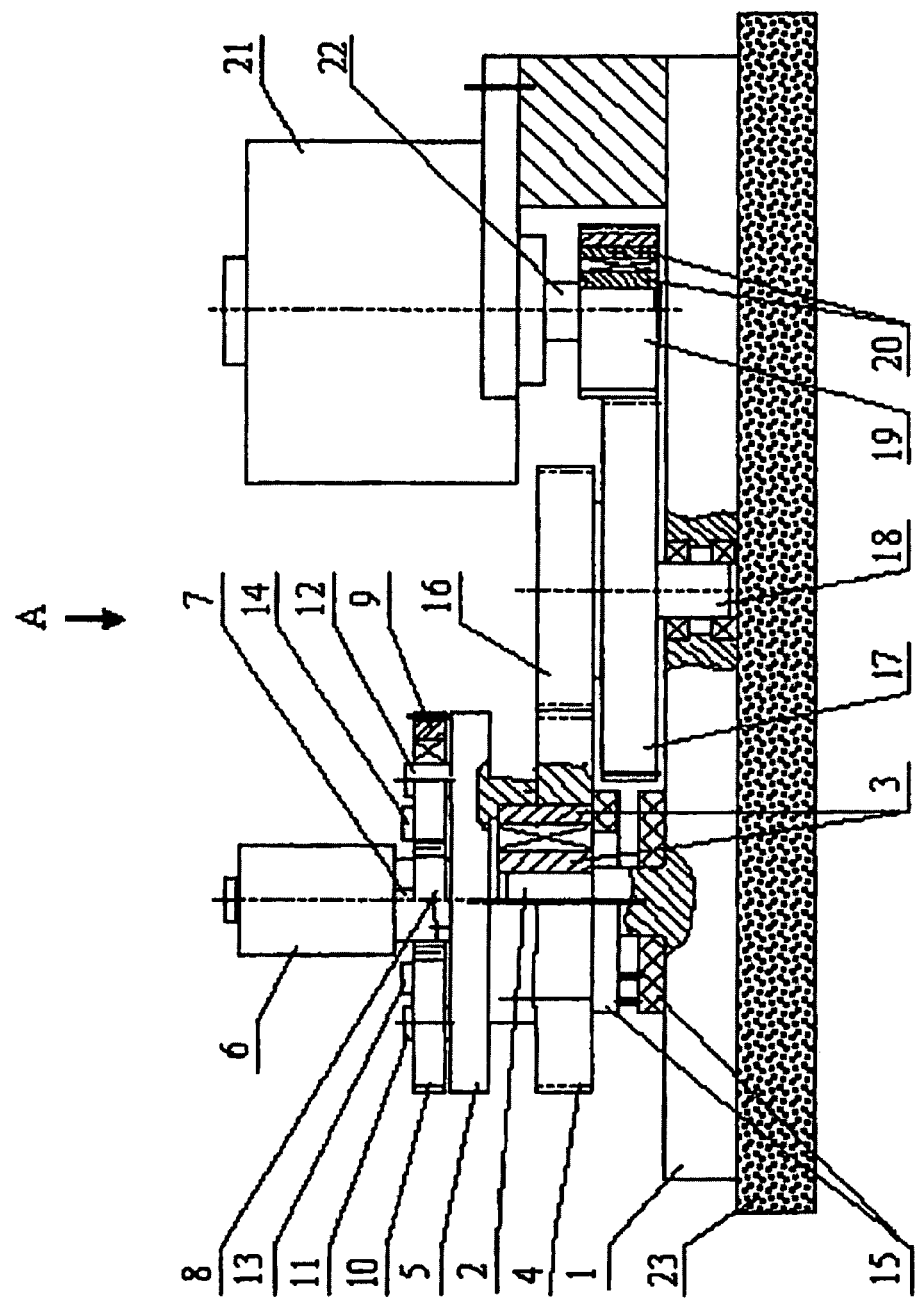
FIG. 1 is a general view of the power unit.
Figure 2:
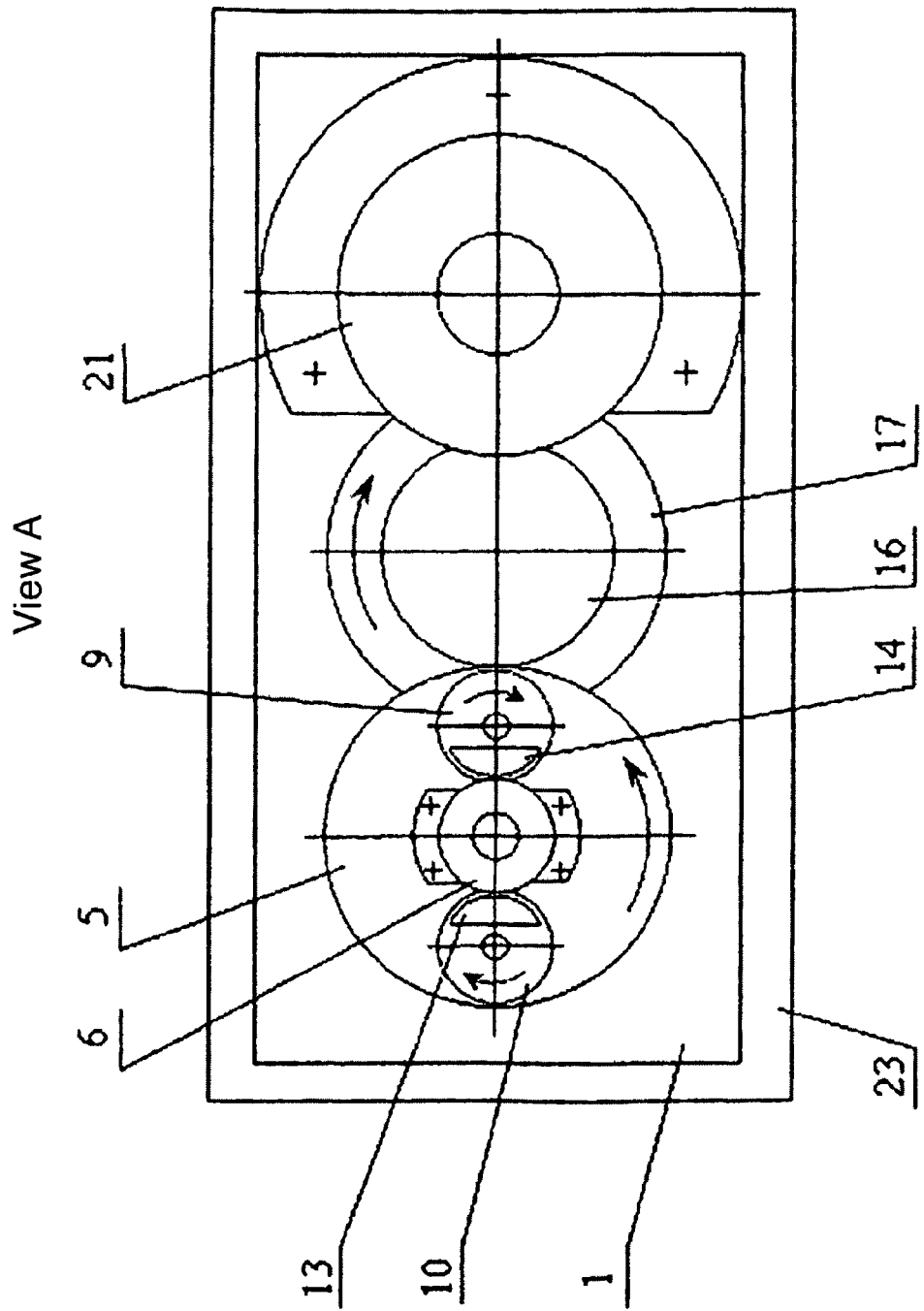
FIG. 2 is view A in FIG.1.

A trial prototype of a small capacity power unit according to the invention similar to that depicted in FIGS.1 and 2 was built and successfully tested in August 2008.

The invention claimed is:

1. A power unit, comprising:
a base;
a first assembly coupled to the base and rotatable relative to the base in one direction;
a motor having a shaft coupled to the first assembly, the shaft axially aligned with a center of rotation of the first assembly;
a first unbalanced mass rotatably mounted to a platform of the first assembly, rotatable by the shaft of the motor and having a first axis of rotation spaced from and parallel to the shaft of the motor;
a second unbalanced mass rotatably mounted to the first assembly and rotatable by the shaft of the motor positioned on an opposite side of the shaft from the first unbalanced mass and having a second axis of rotation of the second unbalanced mass parallel to and spaced from the shaft of the motor;
an electrical generator having a rotor; and
a drive train coupled between the first assembly and the rotor of the electrical generator, comprising:
a first drive coupled to the first assembly;
a second drive coupled to the rotor of the electrical generator; and
a kinematic linkage capable of transmitting torque between the first drive and the second drive.

2. The power unit of claim 1, wherein the first and second unbalanced masses each comprise a drive gear kinematically linked to a common drive gear connected to the shaft of the motor.

3. The power unit of claim 1, wherein the first unbalanced mass is coupled to the motor.

4. The power unit of claim 1, wherein the first unbalanced mass is coupled to the motor with a plurality of gears.

5. The power of claim 1, wherein the motor is mounted relative to the first assembly with the shaft of the motor coaxially aligned with the first drive and rotates the first assembly with the first unbalanced mass.

6. The power unit of claim 1, wherein the first assembly is coupled to the base with a first freewheeling clutch.

7. The power unit of claim 1, wherein the kinematic linkage comprises a speed-increasing gearbox comprising a low-speed gear kinematically linked to the first drive and a high-speed gear kinematically linked to the generator.

8. The power unit of claim 1, further comprising a first freewheeling clutch, wherein the first assembly is coupled to the base with a first freewheeling clutch for transmitting operating torque in one direction from the shaft of the motor to the drive train.

9. The power unit of claim 8, further comprising a second freewheeling clutch coupled between the rotor of the generator and the drive train for transmitting operating torque in one direction from the drive train to the rotor of the generator.

10. A power unit, comprising:
a base;
a platform;

a motor having a shaft, the shaft axially aligned with a center of rotation of the platform;

a first clutch coupled between the base and the platform to allow rotation of the platform relative to the base in only one direction;

a first unbalanced mass rotatable by the shaft of the motor and having a first axis of rotation of the first unbalanced mass parallel to the center of rotation of the platform;

a second unbalanced mass rotatably mounted to the platform and rotatable by the shaft of the motor positioned on an opposite side of the shaft from the first unbalanced mass and having a third axis of rotation of the second unbalanced mass parallel to the center of rotation of the platform;

an electrical generator having a rotor coupled to the base; and a drive train coupled between the platform and the rotor of the electrical generator, comprising:

a first drive coupled to the platform rotatable upon rotation of the platform;

a second drive coupled to the rotor of the electrical generator; and a linkage capable of transmitting torque between the first drive and the second drive.

11. The power unit of claim 10, wherein the first and second unbalanced masses are rotatably mounted to the platform.

12. The power unit of claim 11, wherein the first and second unbalanced masses are coupled to the motor with a gear.

13. The power unit of claim 12, wherein the first and second unbalanced masses each comprise a drive gear linked to a common drive gear connected to the shaft of the motor.

14. The power of claim 10, wherein the motor is mounted relative to the platform with the shaft of the motor coaxially aligned with the first drive and rotates the platform by rotating the first and second unbalanced masses.

15. The power unit of claim 10, wherein the linkage comprises a low-speed gear linked to the first drive and a high-speed gear linked to the generator.

16. The power unit of claim 10, further comprising a second freewheeling clutch coupled between the rotor of the generator and the drive train for transmitting operating torque in only one direction from the drive train to the rotor of the generator.

* * * * *